(12) United States Patent
Bromm et al.

(10) Patent No.: US 7,730,081 B2
(45) Date of Patent: Jun. 1, 2010

(54) SEARCHING BASED ON MESSAGES

(75) Inventors: Kristin D. Bromm, Mountain View, CA (US); Denise D. Hui, San Mateo, CA (US); Joshua T. Goodman, Redmond, WA (US); Omar H. Shahine, San Francisco, CA (US); Ethan N. Ray, Redmond, WA (US); Matthew S. Carr, Seattle, WA (US); Thomas A. Leung, Seattle, WA (US); Wende E. Copfer, Bothell, WA (US); Aly Valli, Seattle, WA (US); Ewa Dominowska, Kirkland, WA (US); Ying Li, Bellevue, WA (US); Chun Yu Wong, Cupertino, CA (US); Paul R. Weber, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 639 days.

(21) Appl. No.: 11/252,899

(22) Filed: Oct. 18, 2005

(65) Prior Publication Data
US 2007/0088687 A1 Apr. 19, 2007

(51) Int. Cl.
G06F 17/30 (2006.01)
(52) U.S. Cl. ............... 707/769; 707/783; 715/752; 715/747; 715/758
(58) Field of Classification Search .......... 707/3, 707/7, 10
See application file for complete search history.

(56) References Cited

U.S. PATENT DOCUMENTS 5,542,024 A * 7/1996 Balint et al. ............ 715/853
5,594,897 A * 1/1997 Goffman ................ 707/102
6,021,412 A * 2/2000 Ho et al. ................ 707/104.1
6,144,958 A * 11/2000 Ortega et al. ............. 707/5
6,212,517 B1 * 4/2001 Sato et al. .............. 707/5
6,430,602 B1 * 8/2002 Kay et al. ............. 709/206
7,240,052 B2 * 7/2007 Sidlosky et al. ........... 707/3
2001/0013029 A1 * 8/2001 Gilmour ................ 707/1
2003/0191689 A1 * 10/2003 Bosarge et al. ........... 705/14
2004/0003097 A1 * 1/2004 Willis et al. ........... 709/228
2004/0139163 A1 * 7/2004 Adams et al. .......... 709/206
2004/0243677 A1 * 12/2004 Curbow et al. ......... 709/206
2005/0120229 A1 * 6/2005 Lahti .................. 713/188
2005/0144573 A1 * 6/2005 Moody et al. ........... 715/825
2005/0228774 A1 * 10/2005 Ronnewinkel ............. 707/2
2005/0289113 A1 * 12/2005 Bookstaff ................ 707/1
2006/0026147 A1 * 2/2006 Cone et al. ............... 707/3

OTHER PUBLICATIONS

Bass, Gordon. Virtual Elves : Keebler IM Bots. Feb. 12, 2003. Dr. Dobb's Portal. http://www.ddj.com/architect/184411635;jsessionid=XIC40SBWJP5X4QSNDLRCKH0CJUNN2JVN?pgno=1.*

* cited by examiner

*Primary Examiner*—John R. Cottingham
*Assistant Examiner*—Nicholas E Allen
(74) *Attorney, Agent, or Firm*—Vierra Magen Marcus & DeNiro LLP

(57) ABSTRACT

While interacting with a messaging interface, keywords or other search criteria are automatically identified and used to perform a search. Search results and sponsored links (or advertisements) are displayed to the user within the messaging interface. To alleviate privacy concerns, this process will not be performed unless the user has explicitly opted-in to the search feature. In another embodiment, the user can highlight keywords in an outbound or inbound message to trigger a search without leaving the messaging interface. In another embodiment, the user can input a search keyword or phrase to trigger a search without leaving the messaging interface.

17 Claims, 14 Drawing Sheets

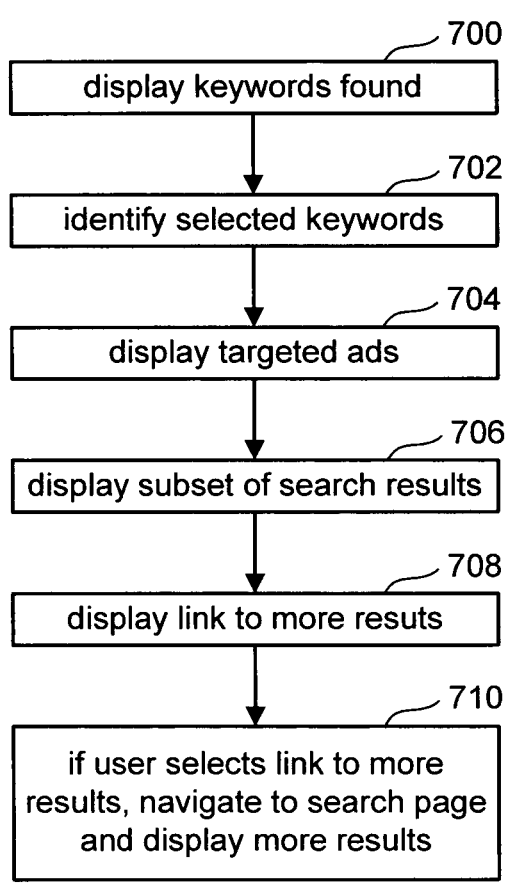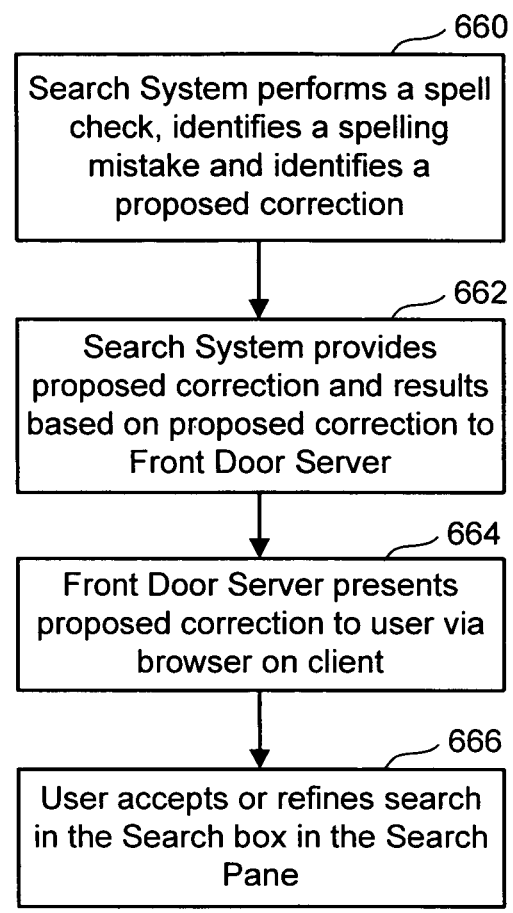
Fig. 12
Fig. 11C

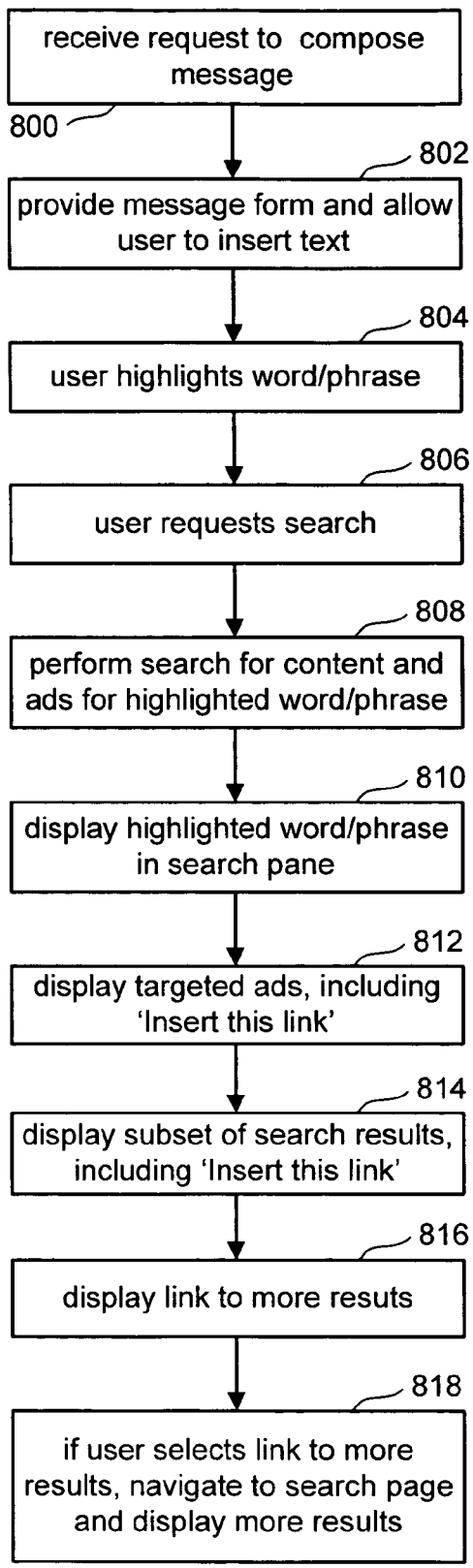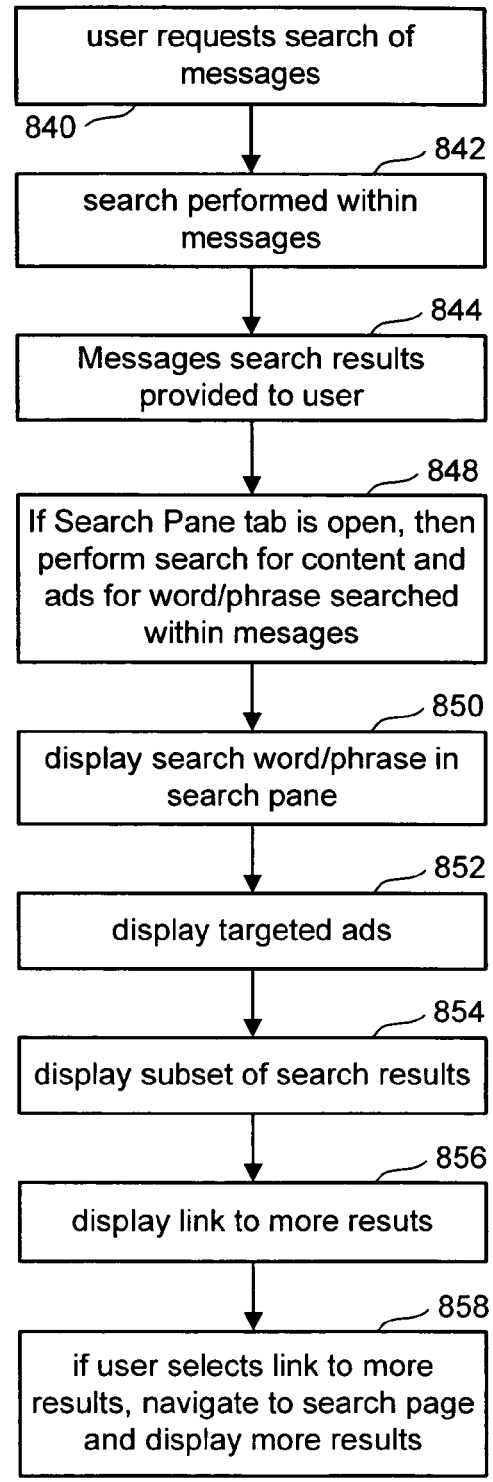
Fig. 14
Fig. 15

SEARCHING BASED ON MESSAGES

BACKGROUND

The evolution of computers and networking technologies from high-cost, low performance data processing systems to low cost, high-performance communication, problem solving, and entertainment systems has provided a cost-effective and time saving means to lessen the burden of performing every day tasks such as correspondence, bill paying, shopping, budgeting information and gathering, etc. For example, a computing system interfaced to the Internet, by way of wire or wireless technology, can provide a user with a channel for nearly instantaneous access to a wealth of information from a repository of web sites and servers located around the world. This information is accessible to the user through actively querying a search engine and/or traversing through related links.

Typically, the information available from websites and servers is accessed by way of a web browser executing on a web client (e.g., a computer). For example, a web user can deploy a web browser and access a web site by entering the web site Uniform Resource Locator (URL) (e.g., a web address, an Internet address, an intranet address, . . . ) into an address bar of the web browser In some instances, a user knows the URL to the site or server that the user desires to access. In such situations, the user can access the site, as described above, by way of entering the URL in the address bar of the browser and connecting to the desired site. In other cases, the user will know a particular site that such user wishes to access, but will not know the URL for such site. To locate the site, the user can simply enter the name of the site into a search engine to retrieve such site. In most instances, however, users desire to obtain information relating to a particular topic and lack knowledge with respect to a name or location of a site that contains the desired information. To locate such information, the user can employ a search function (e.g., a search engine) to facilitate locating the information based upon a query. Due to an increasing amount of users becoming sophisticated with respect to the Internet, searching has become a massively important functionality.

Networks (e.g., the Internet) and computing devices have also enabled users to quickly communicate with one another through utilization of electronic messaging (e.g., email). More particularly, users can specify a subject within a subject line and generate a body of a message. The message can then be delivered nearly instantaneously to specified users. Furthermore, electronic messaging can be utilized to transfer files from a first computer to a second computer through attaching a file to an email message. Due to ease of use and ease of access, email utilization is commonplace in personal and business settings.

While e-mail and search are two of the most important applications associated with computers and networks, there has been very little intermingling between such applications. For instance, if an e-mail message includes terminology that a user is unfamiliar with or includes text in which a user wishes to obtain more information, such user typically must open a search application and manually execute a search for a word or phrase. Requiring such manual searching can negatively affect user-experience with respect to an email application as well as a search function, and often a user will not search to avoid inconvenience, leaving the user ignorant with respect to information associated with text within the e-mail message. Such problems can exist with respect to any sort of electronic document/communication, including an instant messaging conversation, a text message, and the like.

SUMMARY

A system is provided that allows keywords or other search criteria to be identified while interacting with a messaging interface. The keywords or other search criteria are then used to perform a search of the Internet (or other domain). The results are presented to the user within the messaging interface so that the user need not leave the messaging interface to access a search interface. In some embodiments, the search is automatically performed, while in others, a list of possible searches is presented to the user. Combinations are also possible. In some embodiments, to alleviate privacy concerns, the process will not be performed unless the user has affirmatively opted-in to the search feature. In one option, the user can highlight keywords in an outbound or inbound message to trigger a search without leaving the messaging interface. In one embodiment, the user can input a search keyword or phrase to trigger a search without leaving the messaging interface. That is, keywords entered into a search box in a search pane will have results displayed in the search pane.

One example of the technology described herein is implemented as part of an email system; however, the technology can be used with other systems.

One embodiment of the above-described technology includes providing a messaging user interface and providing a user with an option to consent to automatic searching while using said messaging user interface. If the user consents to the automatic searching, then search criteria is automatically determined based on at least one message in the messaging user interface and a search is caused to be performed based on determined search criteria. The results from the search are provided within the messaging user interface if the user had consented to the automatic searching. The search criteria can be anything used to perform a search.

Another embodiment includes providing a messaging user interface, automatically determining multiple search criteria options based on at least one message in the messaging user interface, providing a user with a choice of the multiple search criteria options, receiving a selection of one of the multiple search criteria options, causing a search based on the selected search criteria option, and providing results from the search within the messaging user interface.

The technology described herein can be implemented using hardware, software, or a combination of both hardware and software. The software used is stored on one or more processor readable storage devices including hard disk drives, CD-ROMs, DVDs, optical disks, floppy disks, tape drives, RAM, ROM, flash memory or other suitable storage devices. In alternative embodiments, some or all of the software can be replaced by dedicated hardware including custom integrated circuits, gate arrays, FPGAs, PLDs, and special purpose processors. In one embodiment, the software is used to program one or more processors. The one or more processors can be in communication with one or more storage devices, peripherals and/or communication interfaces.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 11C is a flow chart describing one embodiment of a process that is performed when a spelling error is found.

FIG. 12 is a flow chart describing one embodiment of a process for displaying search results.

FIG. 14 is a flow chart describing one embodiment of a process for searching in response to a manual request.

FIG. 15 is a flow chart describing one embodiment of a process for searching the Internet (or other domain) in response to a request to search messages.

DETAILED DESCRIPTION

Figure 1:
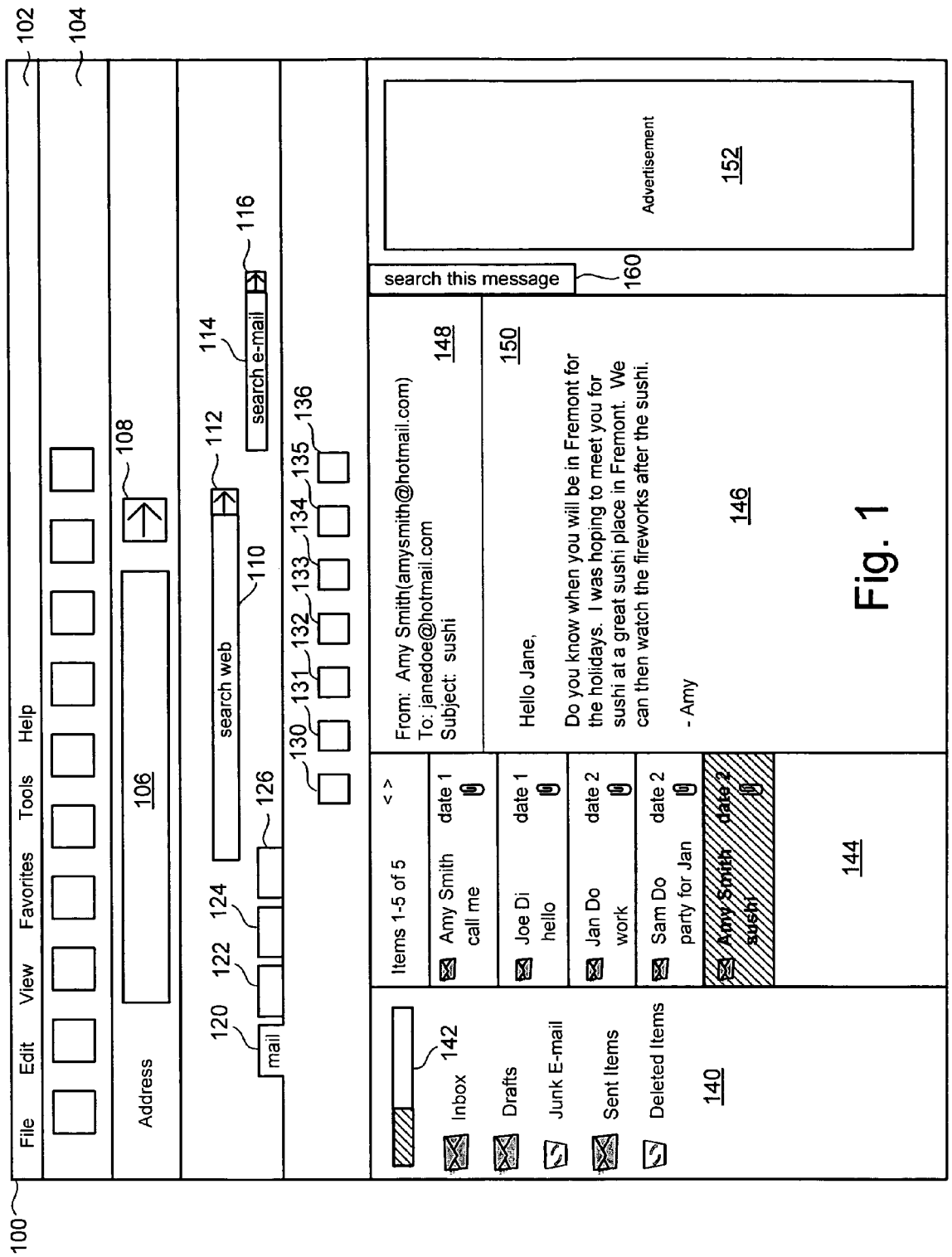
FIGS. 1-6 depict one embodiment of a user interface.

The technology described herein allows a user to search the Internet (or another domain) while using a messaging system (e.g., email system), without having to leave the messaging system's user interface. This searching feature is end user initiated (e.g., the user explicitly opts-in), and will provide a search results and advertisements based on keywords, user information, or other search criteria in (or related to) one or more messages. In some embodiments, instead of searching the Internet, the search can be performed on a local computer, database, network, other domain, or some combination of the above.

In one embodiment, there will be three modes of operation: manual mode, first automatic mode, and second automatic mode.

In manual mode, the user will be allowed to select/highlight one or more keywords in their messages, and the system will call a search API (Application Program Interface) using the selected keywords in order to cause a search and advertisement request to be performed based on those keywords. Advertisement and search results for the selected keywords will be displayed in the messaging user interface. One example of a messaging user interface can be a web page for an email system that is displayed via a browser. In one embodiment, the system can separately call a search API and an advertisement API for search and advertisement results. The communication with the search and advertisement systems is not limited to communication via an API. Other schemes can also be used. In one embodiment, a single system can provide the email services, search services and advertisement services, of some subset thereof.

In the first automatic mode, a process will automatically select one or more keywords (or other search criteria) from one or more messages based on a relevancy rating. This process will rank the keywords in order of relevancy. The most relevant keyword (or most relevant search criteria), or all or X keywords will be provided to a search engine via an API. That search engine will return search results and/or targeted advertisement results. In another embodiment, the system will send the keywords to separate search and advertisement systems. Upon receiving the targeted advertisements and search results, the system will display the search results and targeted advertisements within the messaging user interface.

In the second automatic mode, keywords, phrases or other search criteria will be automatically identified based on relevancy rating from a particular one or more messages. The messaging system will then display those keywords in a "keywords well" within the messaging interface. A keyword well is a user interface component that lists the words extracted from the content on which to perform the search. The user will be provided the opportunity to choose one of the keywords (or other criteria) in order to trigger a search of the Internet (or other domain). In response to the user choosing a keyword (or other criteria) that keyword (or other criteria) is provided to one or more APIs in order to cause a search to be performed based on that keyword (or other criteria). Advertisements and search results are returned and displayed within the messaging user interface. In an alternative implementation, the only difference between the first automatic mode and the second automatic mode is that the user can hide the Search Pane feature in first automatic mode but not in second automatic mode.

FIG. 1 provides an example of a messaging user interface 100. In one embodiment, messaging user interface 100 is provided in connection with an email system. The embodiment depicted in FIG. 1 is for a web-based email system. In other embodiments, other types of email systems can be used. In addition, the technology described herein can be used with other types of messaging systems including, but not limited to, instant messaging systems, chat systems, video conferencing systems, voice communication systems, and web log publishing systems.

Messaging user interface 100 includes toolbar 102 with several drop down menus. Each drop down menu is identified by a title such as File, Edit, View, Favorites, Tools, and Help. In one embodiment, messaging user interface 100 is provided within an Internet browser. One example of an Internet browser is Internet Explorer from Microsoft Corporation. Messaging user interface 100 also includes toolbar 104, which includes several tools associated with the browser. The browser also includes an address field 106 and a "go" button 108. By inserting an address in address field 106 and selecting "go" button 108, the browser navigates to the address inserted in the address field 106. A user attempting to use the browser to access an email system would insert the address for the email system in address field 106. One example of suitable email system is the Hotmail email system from Microsoft Corporation. However, other email systems can also be used. A user wishing to access the Hotmail system will enter "www.hotmail.com" into address field 106 and select "go" button 108. In response to that address, the Hotmail user interface will be provided to the user.

Messaging user interface 100 includes a search field 110 for entering search terms in order to search on the Internet (or within another domain). After entering a search term in field 110, the user would select button 112 to initiate the search. Additionally, search field 114 is provided to enter search terms that will be used to search through various messages in the email system. By entering a search term in field 114 and selecting button 116, that search will be commenced. User interface 100 also includes a series of buttons 130, 131, 132, 133, 134, 135 and 136 (more or less buttons can also be used). These buttons will have various functions depending on the particular mode of the email system. For example, the buttons can be used to reply to a message, forward a message, delete a message, compose a new message, move the message to a new folder, order the arrangement of messages, or provide other tools. Messaging user interface 100 also includes a folder list 140 which lists various folders. In one example, the folders include an Inbox, Drafts, a Junk Email folder, a Sent Items folder, and a Deleted Items folder. Other folders can also be used. Folder list 140 includes a usage bar 142, which indicates how much of the available storage is being used. The gray portion of the bar indicates storage space used and the blank portion of the bar indicates free space.

Messaging user interface 100 also includes message list 144, which lists all the messages in a selected folder. If the Inbox is selected in folder list 140, then message list 144 will list all the emails in the Inbox, which is referred to as the Inbox view. Similarly, if the Sent Items folder is selected in list 140, then message list 144 will list all the emails in the Sent Items folder. The message list 144 will work similarly for other folders. In one embodiment, message list 144 will indicate the sender, the subject, date, and whether any attachment is included (e.g., by displaying a paperclip). By selecting one of the messages in the message list 144 (see shaded message from Amy Smith on date 2), the selected message is depicted in review panel 146. In one embodiment, by double clicking on a message in message list 144, a separate window can be opened to view the particular message. The message can also be displayed within the email application. Review panel 146 shows the header portion of 148 and the body 150 of the message. Header portion 148 indicates who the message is from, who the message is to, and what the subject is. The body of the message 150 indicates the text of the message. In one embodiment, user interface 100 can include one or more advertisements 152. In other embodiments, no advertisements are included.

Figure 2:
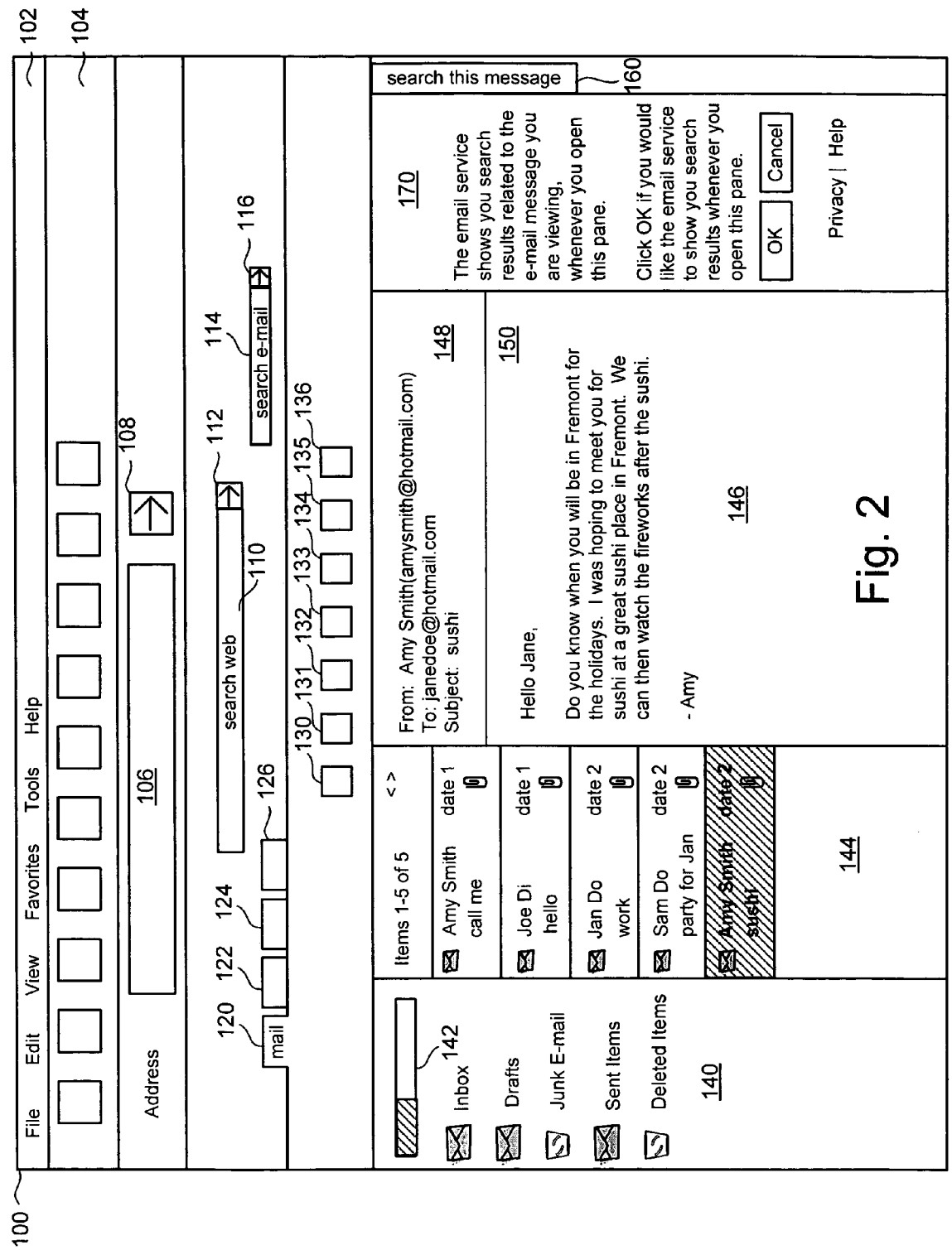

User interface 100 also includes search tab 160. By selecting search tab 160 (e.g., by clicking on the tab with the mouse or other pointing device), the user has ability to opt-in to the search feature described herein. If the user has not yet opted into the search feature, then when the user selects search tab 160 the user is provided with a message inviting the user to opt-in to the search feature. For example, FIG. 2 shows user interface 100 after the user has selected search tab 160. As can be seen, advertisement(s) 152 have been replaced with text seeking consent to use the automatic advertisement feature. This text explains what the feature is about and asks user whether the user wants to enable the feature. At the bottom of the text are four choices: OK button, Cancel button, Privacy link, and Help link. By selecting the OK button, the user is opting-in to the automatic search feature. By selecting the Cancel button, the user is not opting-in to the automatic search feature. If the user selects the Help link, the user is provided with support. If the user selects the Privacy link, the user is provided with a privacy statement.

If the user clicks the OK button and the system is operating in the first automatic mode, the system will automatically identify a set of keywords for the email being selected (e.g., the email depicted in review pane 146). One (or more) of the keywords will then be presented to a Search System and an Advertisement System. The Search System will determine a set of search results based on the keyword. The Advertisement System will target a number of advertisements based on the keyword. In other embodiments, search criteria other than keywords can also be used. After the search and advertisement targeting have been completed, the results will be provided to the user. One example of a search system is the MSN search service at www.msn.com.

Figure 3:
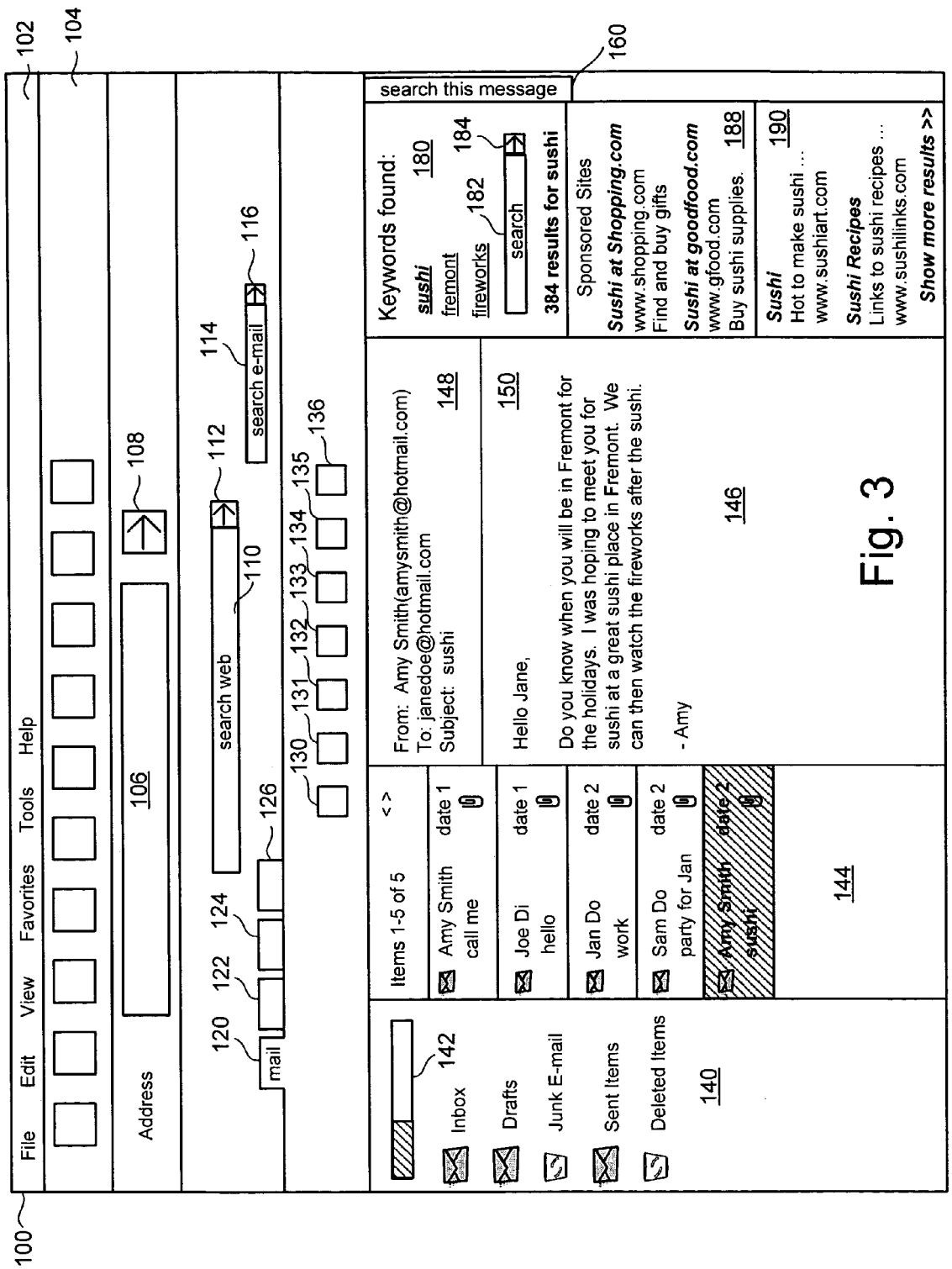

FIG. 3 depicts user interface 100 containing the results of searching and targeting advertisements. A search pane is depicted where text 170 used to be. The search pane includes a keyword section 180, sponsored sites section 188, and search results section 190. Keyword section 180 lists the keywords identified from the email under consideration. In other embodiments, keywords can be based on more than one email. For example, the keywords can be based on all the emails in a particular folder selected, or all the emails in the email system related to that particular user. In one embodiment, the search results are based on only one keyword or one set of search criteria. The system will determine which is the most relevant keyword and only that keyword will provided to the Search System and Advertisement System, or the system will submit all keywords to the Search System and Advertisement System. The keyword provided to the search system will then be (optionally) highlighted. For example, three keywords were identified in FIG. 3: sushi, Fremont, and fireworks. The keyword "sushi" is shown to be bold and italic to indicate that it was the keyword sent to the search system. The other two keywords were identified from the selected message, but sushi was ranked higher so it was sent to the search system. The keyword section 180 also includes a search field 182 and button 184 to enable a search. The user can manually type in a search in order to search the Internet or other domain. Search and advertisement results will appear in the Search Pane.

Below keyword section 180 is sponsored sites section 188, which lists a set of advertisements (also called sponsored sites). Typically, there will be a title for each sponsored site, a link indicating the URL, and some type of tagline. Below sponsored sites section 188 is search results section 190. The search results can be in many forms. In one example, the search results will include a title of the target site, a summary or description of the target site, and a link which indicates the URL of the target site. Other forms can also be used.

In keywords portion 180, each of the keywords identified are depicted as a link. Thus, if the user selects one of the keywords that were not used for this search, the system will then send that keyword to the search and advertisement systems in order to perform searching and advertisement targeting based on the new keyword. The new results will be presented to the user in a form similar to that of FIG. 3.

Figure 4:
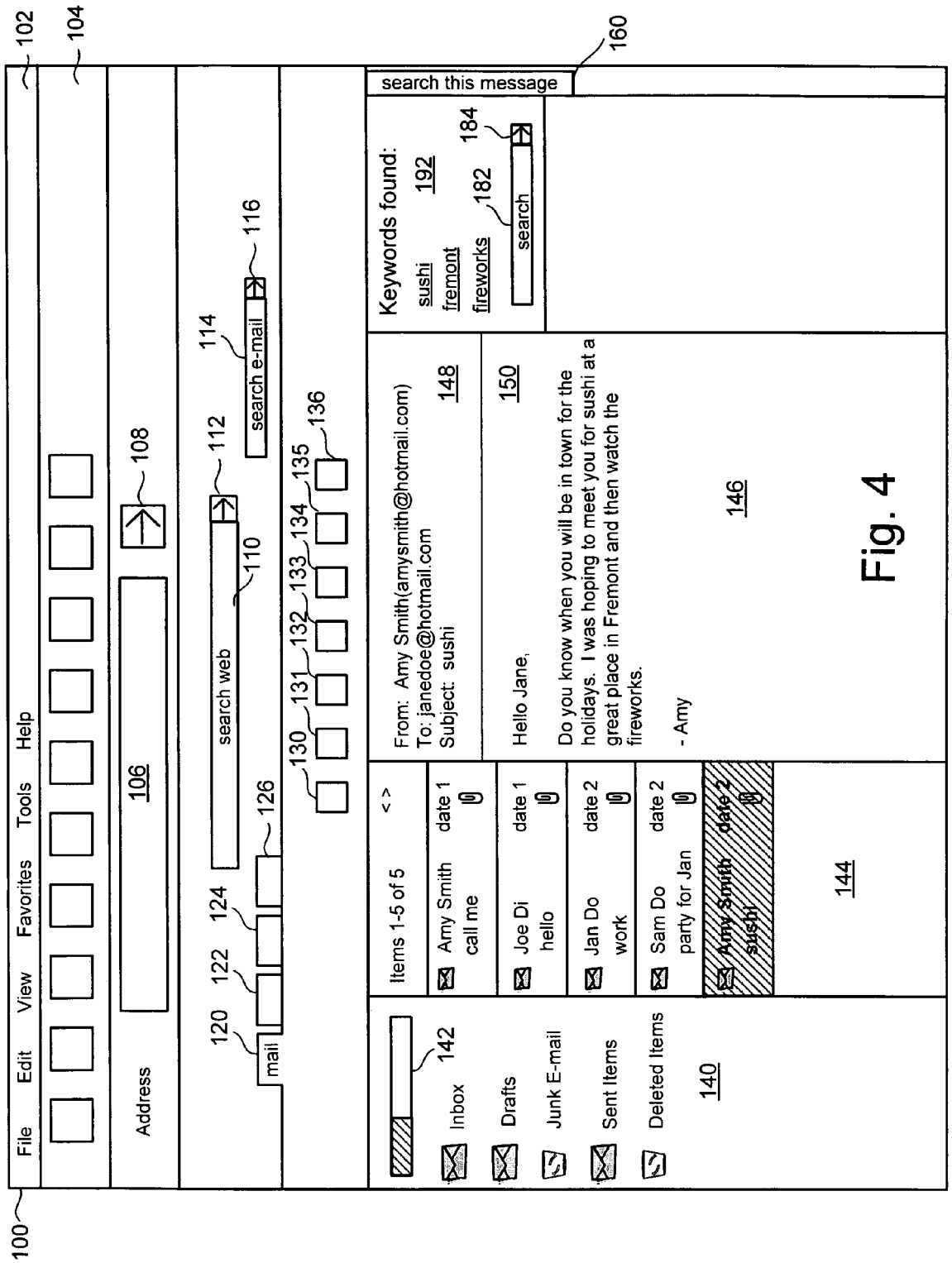

As described above, the system includes more than one automatic mode. The discussion above with respect to FIG. 3 pertains to the operation of the first automatic mode. The second automatic mode includes first presenting the keywords identified in the email to the user prior to utilizing the search and advertisement systems. This is depicted in FIG. 4, which shows keyword portion 192. After user has opted-in to the automatic search feature, keywords will be automatically identified for the message (or messages) under consideration. Those keywords are then displayed to the user in keyword portion 192. The user then has the option to choose one of the keywords. In response to the user choosing a keyword, the chosen keyword will be provided to the search and advertisement systems. The results will then be depicted in a form similar to that of FIG. 3. Note that some embodiments do not require a user to opt-in.

Figure 5:
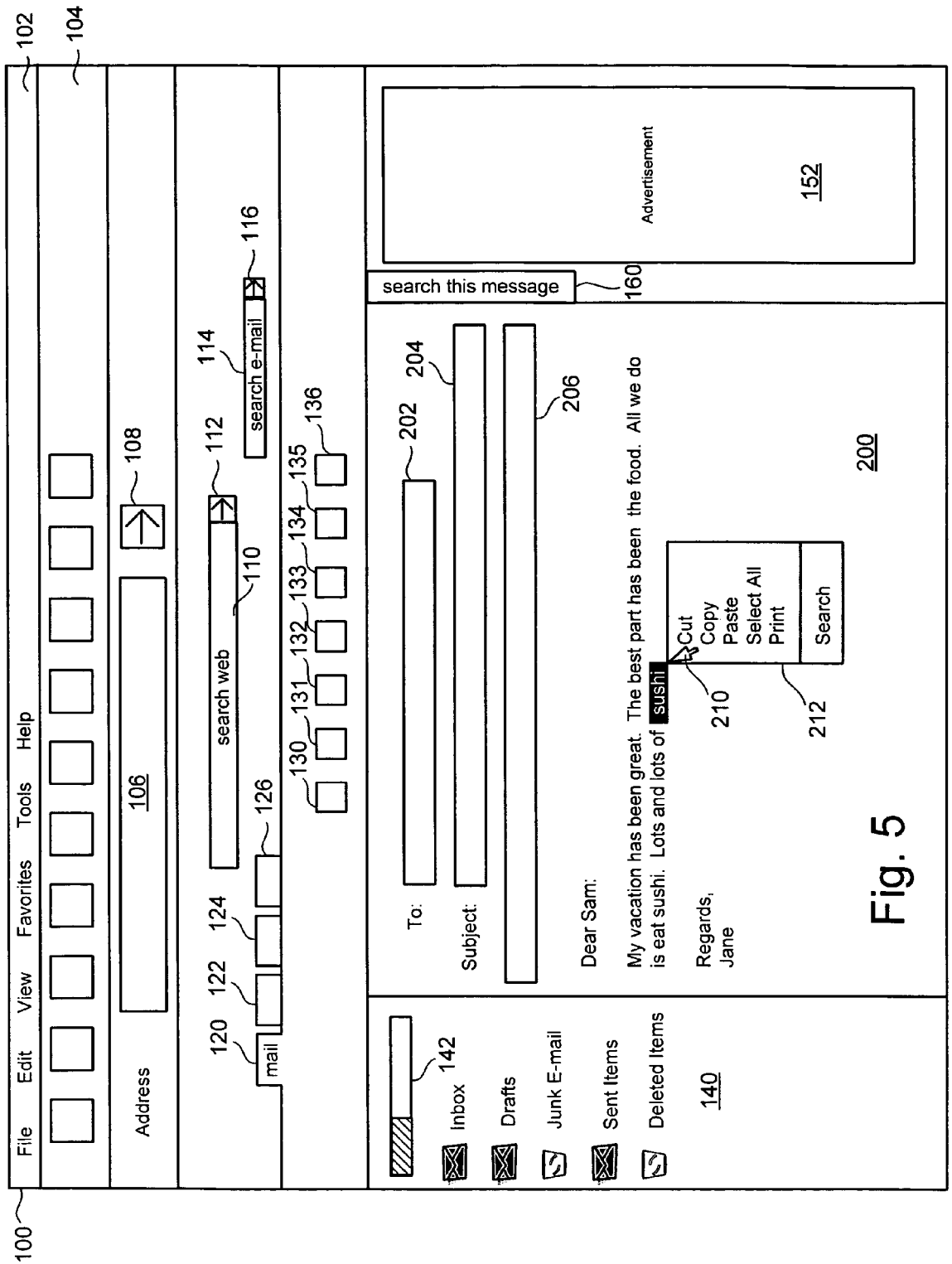

The system also includes a manual mode. In one embodiment, the manual mode allows the user to highlight text of an email while an email is being composed or read. FIG. 5 provides one example of the manual mode being utilized while the email is being composed. FIG. 5 shows the email system with the compose form 200. In one embodiment, compose form 200 includes "To" field 202 for entering the target address of the email, "Subject" field 204 for entering the subject of the email, and toolbar 206 which includes various tools for formatting the email text. Underneath toolbar 206 is an area for the user to type in the text of the email.

Figure 6:
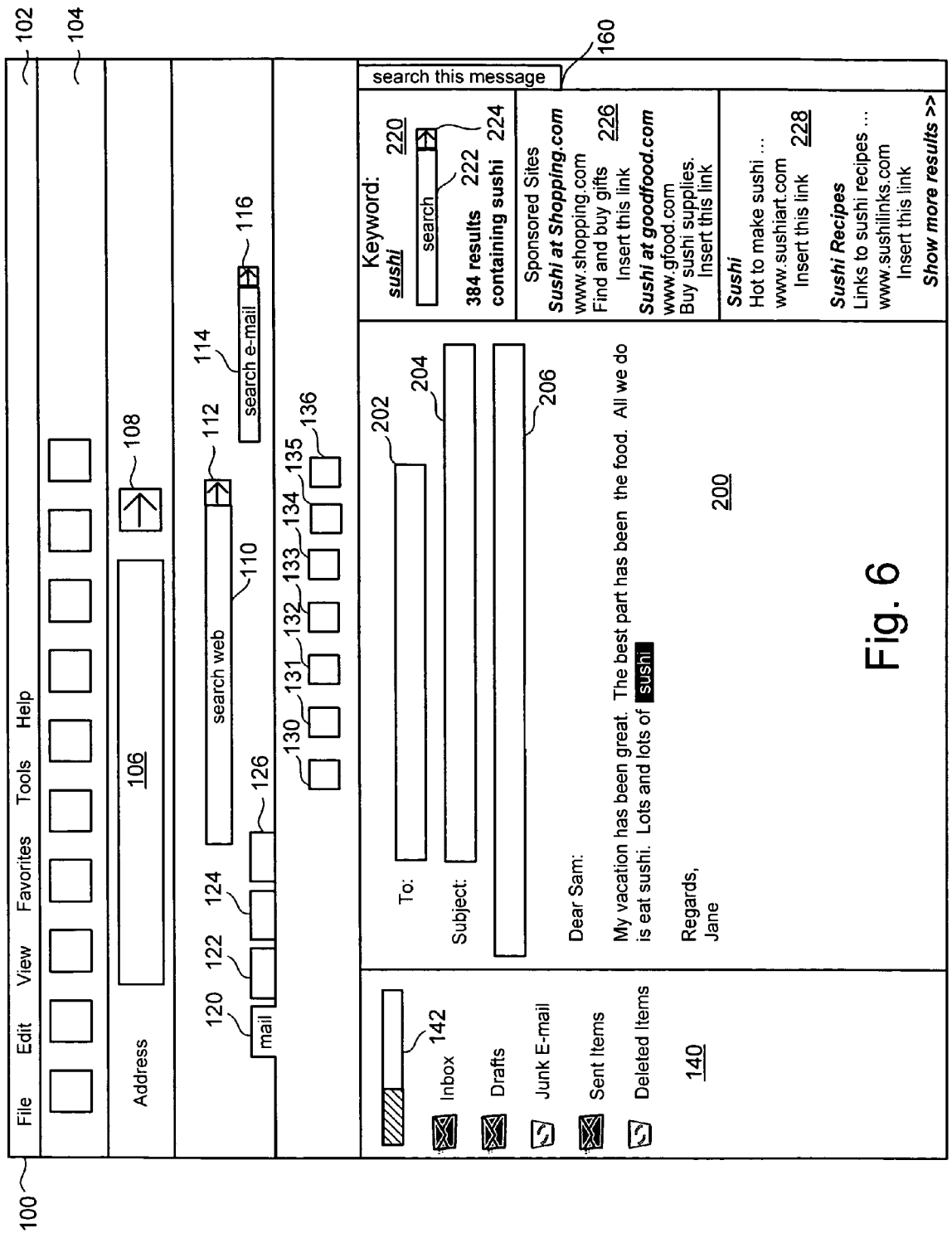

FIG. 5 shows that the user highlighted the word "sushi." That is, instead of being black text on a white background, the text "sushi" is white text on a black background. In one embodiment, a user highlights by dragging the cursor. Other methods for highlighting can also be used. A user could also highlight a word or phrase while reading an email in the inbox. After highlighting the word "sushi," the user right-clicked on the mouse (by selecting the right button on the mouse or other pointing device). In response to right-clicking, menu 212 is depicted next to cursor 210. Menu 212 provides various options for formatting and an option for searching. If the user then selects the "search" option of menu 212, the highlighted word will then be presented to the search system and advertisement system. The results from the searching and advertisement targeting will be provided in a format as depicted by FIG. 6. The interface of FIG. 6 includes keyword portion 220, which shows the one keyword (or phrase) that was highlighted. Keyword portion also includes a search field 222 with button 224 to initiate a search of the Internet. The user interface also includes sponsored sites section 226 and search results section 228 that are similar to sponsored sites section 188 and search results section 190 of FIG. 3. Note that more than one keyword may be highlighted. The function of providing menu 212 and initiating the search can be performed at the client using Java Script. In some embodiments, the sponsored sites section 226 and search results section 228 will include a "Insert this link" option. If the user selects this option, the associated link is added to the email message. In one embodiment, the link can be added by hyper-linking the highlighted word or phrase. If the user has not highlighted a word, then the link can be added a specified distance below the current or last cursor position.

Figure 7:
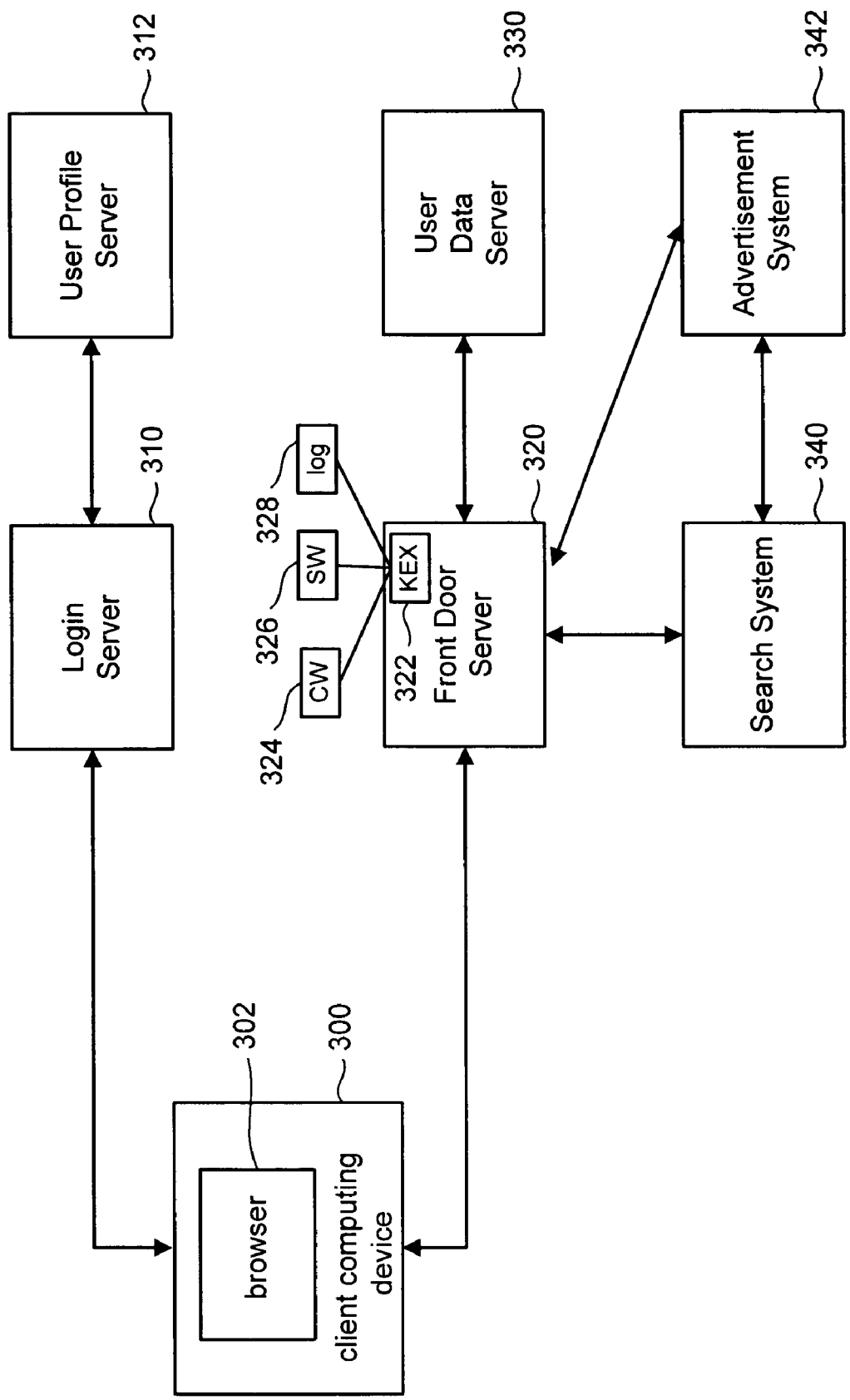
FIG. 7 is a block diagram of one embodiment of a system that implements the technology described herein.

FIG. 7 is a block diagram depicting various components of one embodiment of a system that can provide a service in accordance with the technology described herein. FIG. 7 shows a client computing device 300 which can be a computer, mobile telephone, handheld PDA, smart appliance, or other computing device. Client computing device 300 includes an Internet browser 302 or other type of browser. Browser 302 is in communication with an Internet-based email service. To start the interaction with the email service, browser 302 would first communicate with Login Server 310. Login Server 310 communicates with User Profile Server 312 to verify that a username and password are correct, as part of an authentication process. After a user is authenticated, browser 302 communicates with Front Door Server 320. In one embodiment, there may be many Front Door Servers 320 which are accessed via a load balancer. Front Door Server 320 provides the email services to browser 302. Front Door Server 320 includes a Keyword Extractor (KEX) 322, which is used to extract keywords from one or more messages for a particular user. In addition Front Door Server 320 includes configuration files that contain values that control availability of the feature by market and class of user, and control preferences and relevancy thresholds. Keyword Extractor 322 makes use of various files or other data structures, including common word file 324, sensitivity word file 326, and prior query log file 328. Front Door Server 320 is in communication with User Data Server 330, which stores personal information about the various users including the user's preferences, demographic information, geolocation information, behavior information, psychographic information, and email data. Front Door Server 330 is also in communication Search System 340, which includes an Internet Search System (e.g., MSN) that can search the Internet or other domain. Search System 340 is in communication with Advertisement System 342. In one embodiment, Front Door Server 320 provides one or more keywords to Search System 340. Search System 340 performs a search of the Internet (or other domain) based on the presented keyword(s). Search System 340 also presents the one or more keywords to Advertisement System 342. Advertisement System 342 uses the keyword(s) to identify a set of targeted advertisements for the user. In another embodiment, Front Door Server 320 can communicate directly with Advertisement System 342. The operation of various components depicted in FIG. 7 will be explained in more detailed with respect to the flowcharts of FIGS. 8-15. Other examples of systems that can serve advertisements can be found in U.S. patent application Ser. No. 11/030,222, "Contextual Ad Processing On Local Machine," Shahine and Rashid, filed on Jan. 6, 2005; and U.S. patent application Ser. No. 11/139,750, "Advertising In Application Programs" Joshua Goodman and Christopher Meek, filed on May 27, 2005, both applications are incorporated herein by reference in their entirety.

Figure 8:
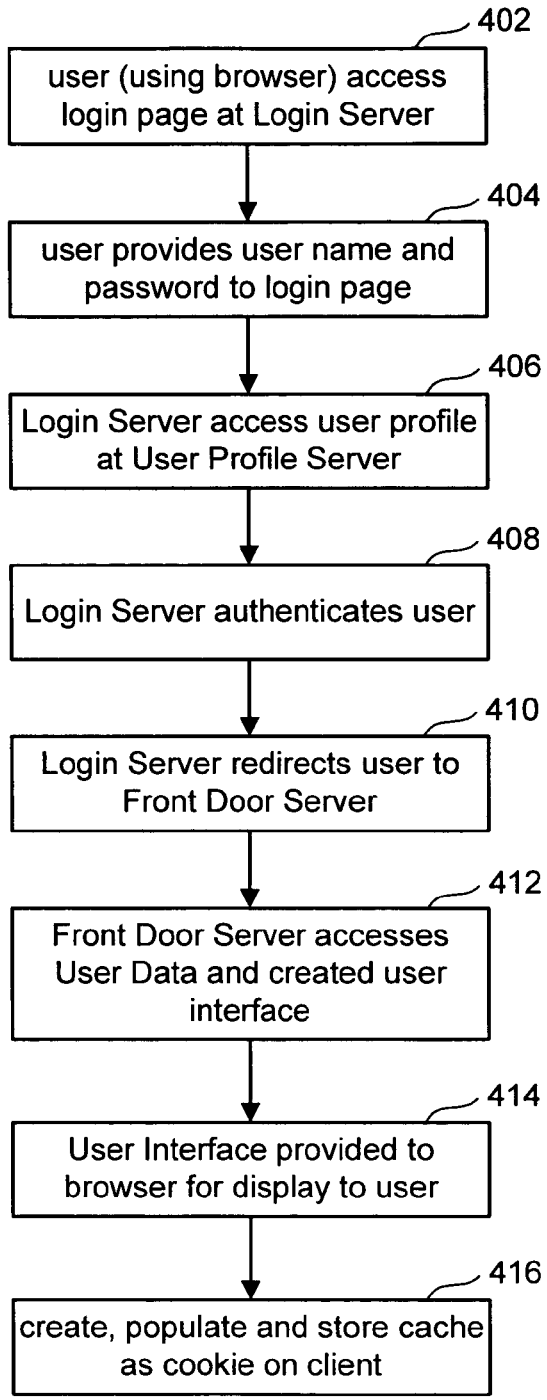
FIG. 8 is a flow chart describing one embodiment of a process for commencing interaction with an email system.
Figure 13:
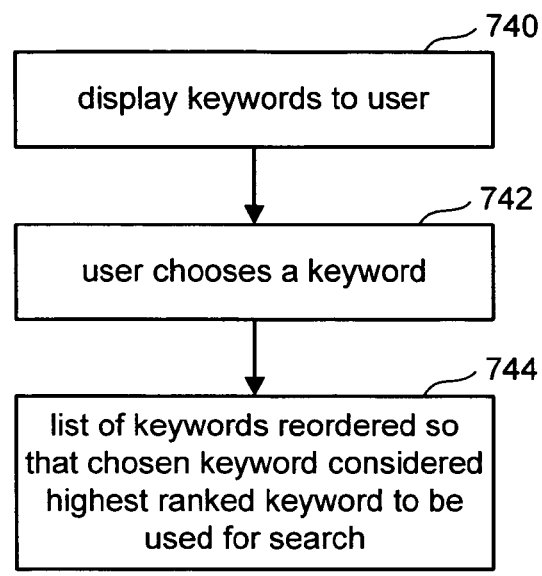
FIG. 13 is a flow chart describing one embodiment of a process for allowing a user to choose search criteria.

FIG. 8 is a flowchart describing one embodiment of a process for initiating the email service associated with FIGS. 1-7. In step 402, a user operating browser 302 accesses a login page for the email service. In one embodiment, that login page is accessed by entering a URL for the login page and browser 202 navigating to the login page by contacting Login Server 310 using HTTP. The login page will be provided back to browser 302 and displayed within browser 302 on client computing device 300. In one embodiment, the login page will include a field to enter a username and a field to enter a password. In step 404, the user provides the user name and password to the login page. That username and password are sent from client device 300 to Login Server 310. Login Server 310 contacts user profile 312 in step 406 in order to access the user profile associated with the username. In step 408, the login server 310 authenticates the user based on the username and password data stored in the user profile obtained from User Profile Server 312. In step 410, login server 310 will redirect browser 302 to Front Door Server 320. Based on the user data passed to Front Door Server 320 (originally stored in User Profile Server 312), Front Door Server 320 accesses the email information in User Data Server 330 associated with the identity was authenticated in step 408. Based on that email data from User Data Server 330, Front Door Server 320 will create a user interface. In one embodiment, the user interface is created using HTML, Java Script and/or various media (e.g., images, sounds, etc.). That user interface is provided to user by browser 302 in step 414. In one embodiment, the result of step 414 could include messaging interface 100 described above (see e.g., FIG. 1).

In step 416 of FIG. 8, Front Door Server 320 creates, populates and stores a cache of keywords for the user. In one embodiment, that cache of keywords is stored as a cookie on client computing device 300. The contents of the cache will include a set of default keywords that can be used when no keywords can be identified by Keyword Extractor 322. In one embodiment, the default keywords are based on relevancy to the stored messages in User Data Server 330. In another embodiment, the default keywords can be based on user demographics, user profile information, or user suggestion/input.

Figure 9:
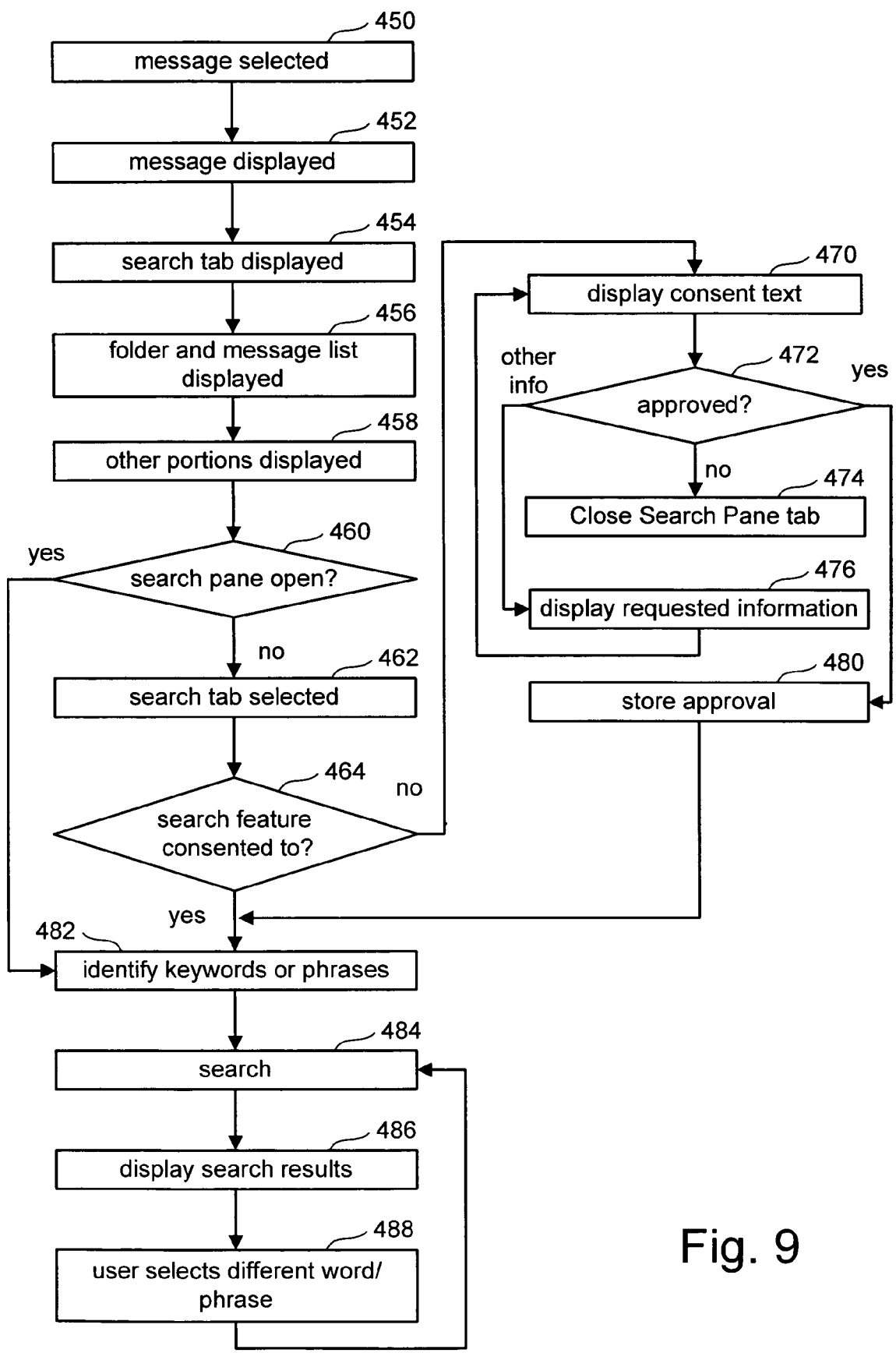
FIG. 9 is a flow chart describing one embodiment of a process for reviewing a message and causing a search.

Once the user interface is depicted to the user, the user can choose a folder (from folder list 140) or an email (from message list 144). In response to a message being selected, the process in FIG. 9 is performed. In one embodiment, the process of FIG. 9 is performed as part of the process of reading email in the user's Inbox or other folder.

In step 450 of FIG. 9, a particular message is selected. In step 452, that message is displayed, as depicted in FIG. 1 or in another suitable manner. In step 456, folder list 140 and message list 144 are displayed. In step 458, other remaining portions of the user interface are displayed. In step 460, it is determined whether the search pane is open. In one embodiment, there can be a cookie on the client device 300 indicating whether the search pane is open or closed. For example, FIG. 1 shows the search pane closed, while FIGS. 2-4 show the search pane open. If the search pane is not open, then the system waits for the search tab 160 to be selected (step 462). After the search tab has been selected, it is determined in step 464 whether the search feature has already been consented to (whether the user has opted in). In one embodiment, there can be a cookie stored in the client device or a flag stored in the user profile in User Data Server 330 indicating whether the user has consented to the search function. If the search feature has not already been consented to, then in step 470, the consent text is displayed. For example, consent text 170 of FIG. 2 is displayed. The system then waits for the user to make a selection between approving the consent text (e.g., selecting the "OK" button), disapproving of the consent text (e.g., selecting the "Cancel" button), or requesting further information (e.g., selecting the "Privacy" link or "Help" link). If the user does not approve of the consent text (e.g., selecting the "Cancel" button), then the Search pane is closed in step 474 and display advertisement 152 is added back to the user interface. If the user asks for other information, then the other information requested (e.g., "Help" or "Privacy") will be displayed in step 476. If the user does consent to the using of this search feature, then that consent is stored in the cookie or flag discussed above (step 480). After storing the consent, the process continues in step 482. Similarly, if in step 464 it is determined that that search feature was already consented to, then the process continues at step 482.

In step 482, keywords or phrases are automatically identified for the particular message selected. In another embodiment, step 482 is performed for the message selected. In another embodiment, step 482 is performed for all messages within the selected folder. In another embodiment, step 482 is performed for all messages associated with the user. Step 482 can include identifying one keyword or multiple keywords. In addition, search criteria other than or in addition to keywords can also be identified. In step 484, Front Door Server 320 presents the keyword(s) to Search System 340 and Advertisement System 342. If operating in the first automatic mode, the most relevant keyword is (or all keywords are) automatically provided to Search System 340 and Advertisement System 342. The results from Advertisement System 342 and Search System 340 are presented back to Front Door Server 320, which provides those results to browser 302 in step 486. Those results are presented to the user via browser 302. For example, the interface of FIG. 3 can be provided to the user. In response to that interface, the user may select one of the other keywords presented in keyword portion 180. If so, the process loops back to step 484 and a new search is performed based on the new keyword selected. In alternative embodiments, the searching on the Internet (or other domain) and identification of advertisements can be based on information other than the text of a message; for example, message characteristics (e.g., length of message, presence of an attachment, etc.), images found in or associated with the message, audio found in or associated with the message, video found in or associated with the message and user behavior can also be used. In some implementations, these other sources of information can be used to identify search criteria that is used for subsequent searching and identification of advertisements.

Figure 10:
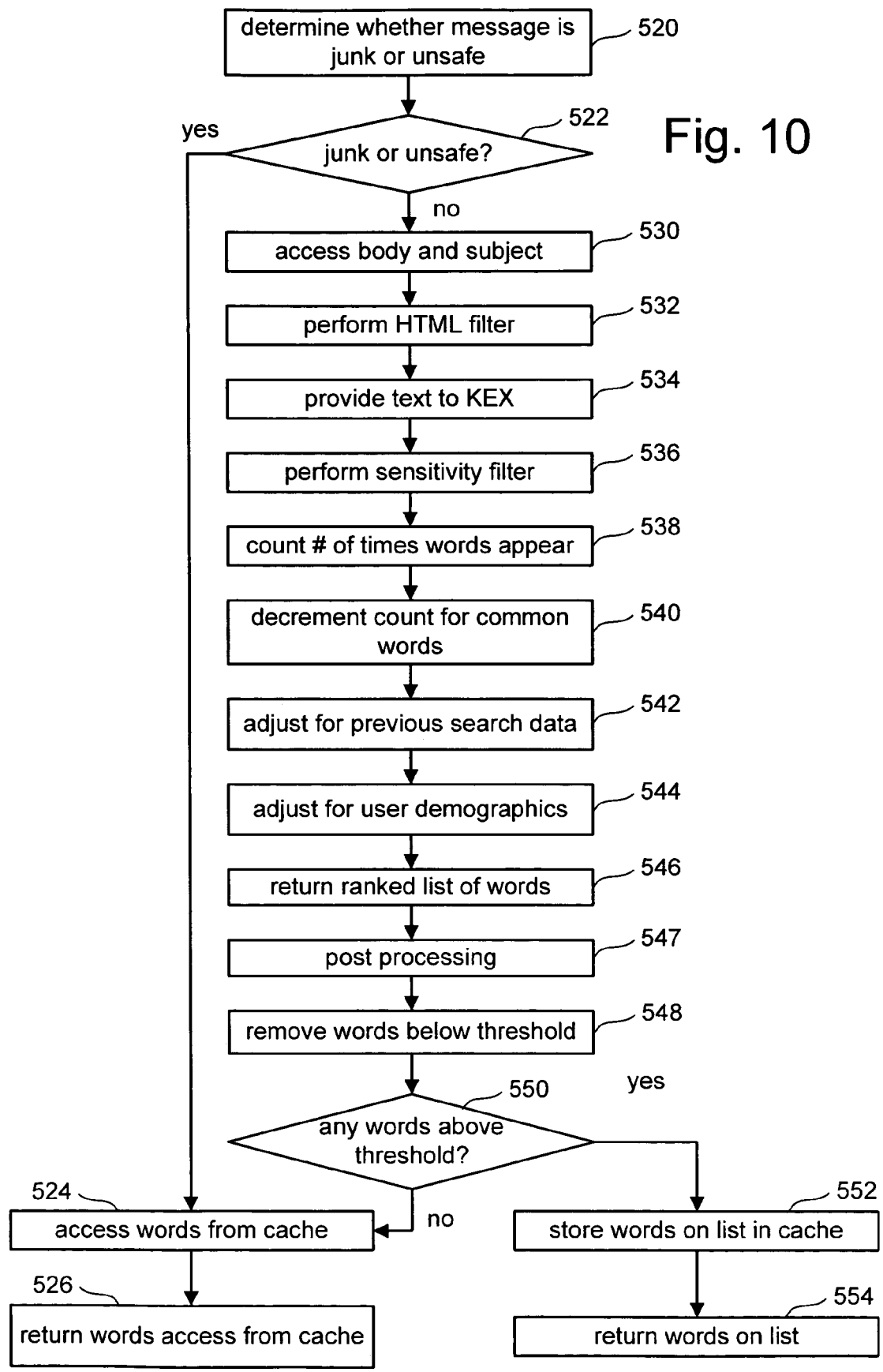
FIG. 10 is a flow chart describing one embodiment of a process for identifying search criteria.

FIG. 10 is a flowchart describing more details of the process of identifying one or more keywords (e.g., step 482 of FIG. 9). The contents of the emails are stored on User Data Server 330 and accessed by Front Door Server 320 in order to create the HTML interface depicted on browser 302. Keyword Extractor 322 has access to the email data from Use Data Server 330. In step 520, Front Door Server 322 determines whether the particular email message under consideration is junk email or otherwise unsafe email. In one embodiment, an unsafe message can be a message with a virus or other malicious software. If the email message under consideration is determined to be junk or unsafe by any process (step 522), Front Door Server 320 will not request Keyword Extractor 322 to identify keywords. Instead, Front Door Server 320 will access the cache stored as a cookie on client device 300 in order to choose one or more of the default words in step 524. These words from the cookie will be returned as a result of the process of FIG. 10 in step 526.

If the email was not Junk email or unsafe email (step 552), then Front Door Server 320 will access the text of the body and subject of the email (step 530) and perform a HTML filter in step 530. That is, the text will be passed through a filter that removes non-text elements. For example, if there are HTML tags within the text then the HTML tags will be removed. In addition, the system will remove all standard message headers from a message thread (e.g., To and From headers). Note that if the email is not in HTML format, the HTML filter need not be performed. Some messages (e.g., non-English messages) are encoded (e.g., base 64, quoted-printed, uuencoded, etc.). For those messages, the system may decode the data and then perform HTML decoding (e.g., from & ->'&') before removing HTML tags. In step 534, the text that resulted from the HTML filter will be provided to the Keyword Extractor 322. In step 536, the Keyword Extractor 322 will perform a sensitivity filter based on sensitive words file 326. If the email includes certain sensitive words related to obscene issues, sad issues, etc., the words identified by the sensitivity filter can be removed from consideration. Alternatively, the email can be discarded from keyword extraction if it fails the sensitivity filter. For example, if the email is about death, it may not be appropriate to do searching or targeting of advertisements based on the email. Similarly, if the email is obscene, the obscene content should not be used to perform searching on the Internet. If the email is discarded from keyword extraction, default words can be used for searching. In one embodiment, the sensitivity filter will use a off-limits keyword list that identified words that cannot be used as keywords. This list can be pre-populated by the distributor of the software, populated by the search system over time, populated by a user who can mark words to add to the off-limits keyword list, or a combination of the above. In one embodiment, a user can define a list of keywords that the user does not want to search on so that the sensitivity filter will remove those words from consideration.

In step 538, Keyword Extractor 322 will count the number of times each word appears in the email text provided. The count for each word will be decremented if the word is a common word, as identified by common word file 524. In step 542, the counts are adjusted based on previous search data stored in log 328. In one embodiment, log 328 is populated by information from Search System 340. In another embodiment, log 328 can be residing on Search System 340. If a particular set of one or more keywords are the same as or similar to past search queries, then the count for those particular searched keywords will be incremented. In another embodiment, any keyword that is similar to a prior search will automatically be selected as a keyword. In another embodiment, if there are no keywords or no keywords that meet the threshold (see below), then keywords identified from previous emails can be used. In another embodiment, words associated with quality queries can be given preference, where a quality query is a query that generates search results with high user satisfaction ratings. In step 544, the keyword counts can be adjusted based on demographics. For example, if a keyword matches particular demographics data stored in the user profile, then the count for that keyword can be incremented. In step 546, the Keyword Extractor 322 will return a ranked list of words. The ranking will be based on the counts for each word. In step 547, post processing will be performed. In one embodiment, the post processing includes preventing words which look like duplicates or near-duplicates from being used. If a word is determined to be a duplicate, it will be deleted from the ranked list. In step 548, Front Door Server 320, which received the rank list of words from Keyword Extractor 322, will compare the counts for each word to a threshold value which can be set by an administrator (based on trial and error). Any word having a count below the threshold will be removed from the list in step 548. If there are no words above the threshold (at 550), that is no words are left on the list after step 548, then the process continues at step 524 by accessing the default words from the cache stored in the cookie in client computing device 300. If there are one or more words remaining on the list after in step 548, then in step 552, those words remaining on the list are added to the cache stored in the cookie on computing device 330. In step 554, the words that were remaining on the list after step 548 and stored in the cache in step 552 are returned as the keywords to be used for future searching.

In other embodiments of the keyword extraction process, greater weight can be provided to words from different portions in the email. Additionally, more weight can be provided to words that are relevant to preferences in a user profile. In another embodiment, the keyword extraction process can be performed on client computing device 300.

Other processes for identifying keywords can also be used. More information about keyword identification can be found in U.S. patent application Ser. No. 11/218,124, filed on Sep. 1, 2005, titled "Implicit Queries For Electronic Documents," inventors Joshua T. Goodman, Kristin D. Bromm, Denise D. Hui, Vitor Rocha de Carvalho, incorporated herein by reference in its entirety.

Figure 11A:
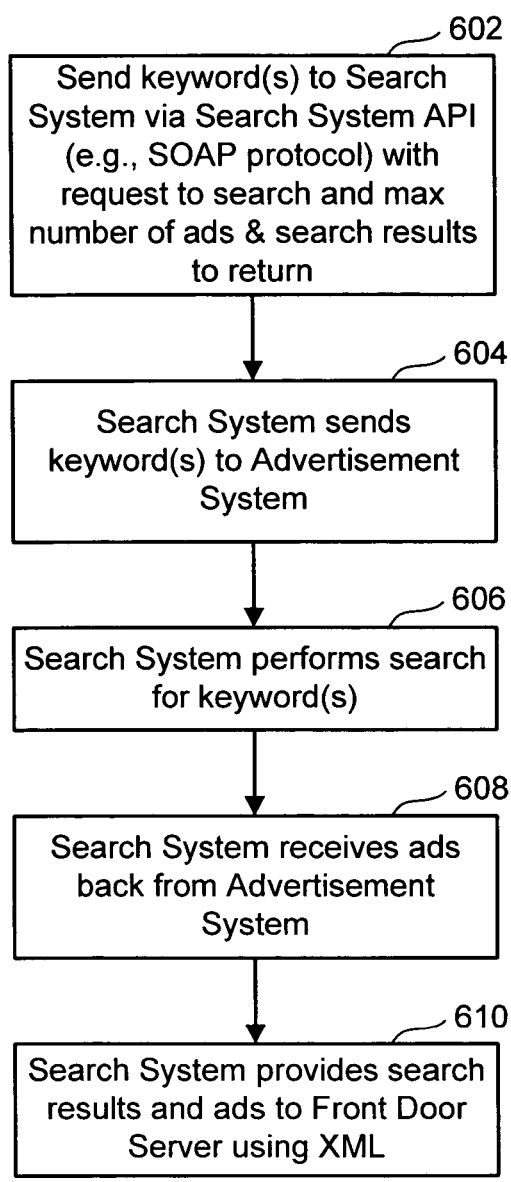
FIG. 11A is a flow chart describing one embodiment of a process for causing a search to be performed.

FIG. 11A provides a first embodiment of a process for performing the searching of step 484 of FIG. 9. In step 602 of FIG. 11A, one or more keywords that have been previously identified are transmitted by Front Door Server 320 to Search System 340. If the system is operating in the first automatic mode, then the most relevant (e.g., highest ranked) keyword is sent. In one embodiment, the keywords are provided to Search System 340 with a request to search using an API for Search System 340 in the SOAP protocol. The message requesting the search will also include a value indicating the number of advertisements to return with the search results and a value indicating the number of search results to return. If the number of advertisements is zero, then Search System 340 will understand the request to not include a request to target advertisements. In step 604, Search System 340 sends the keyword with a request to target advertisements to Advertisement System 342. In response to the request from Search System 340, Advertisement System 342 will identify advertisements most relevant to the keyword and provide those advertisements to Search System 340 in step 608. Search System 340 will identify sites on the Internet that are most relevant to the keywords and package those search results with the advertisements into an XML file. The XML file will be returned to Front Door Server 320 in step 610.

Figure 11B:
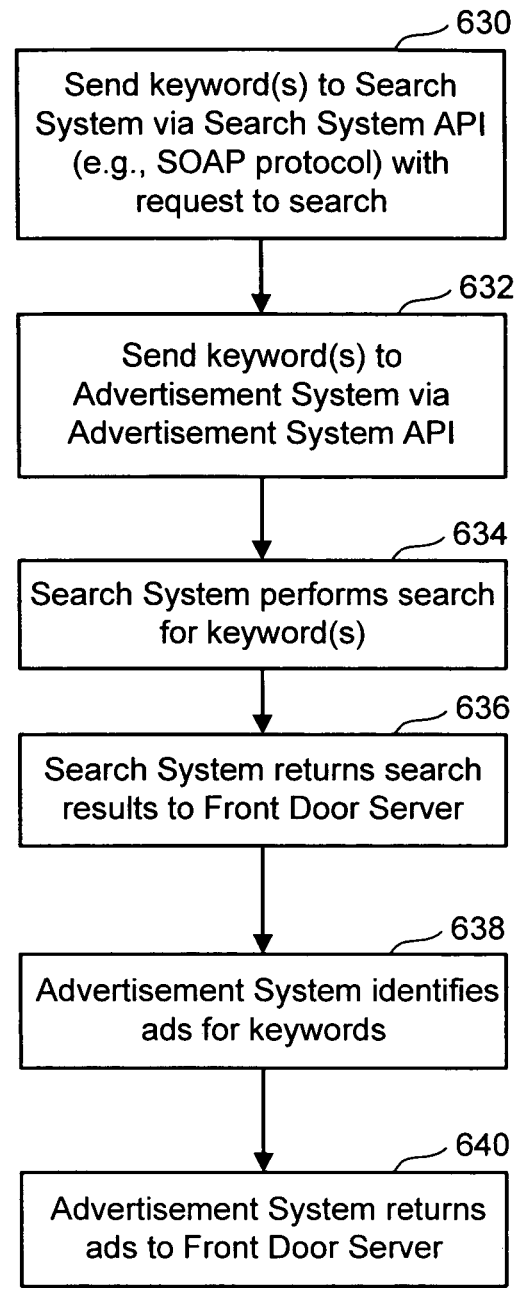
FIG. 11B is a flow chart describing one embodiment of a process for causing a search to be performed.

In another embodiment, Front Door Server 320 can talk directly to Advertisement Systems 342, rather than communicating with Advertisement System 342 via Search System 340. FIG. 11B depicts a process for searching in accordance with that embodiment. In step 630, Front Door Server 320 sends the keywords to the Search System 340 via the API and SOAP (or other) protocol in order to request a search be performed. In step 632, Front Door Server 320 sends the keyword(s) directly to Advertisement System 342, via an API for Advertisement System 342. Steps 630 and 532 can be performed serially or synchronously. In step 634, Search System 340 performs the search for presented the keyword(s) provided in step 630. In step 636, Search System 340 returns the search results to Front Door Server 320. In step 638, Advertisement System 342 targets advertisements in response to the keywords. In step 640, Advertisement Server 342 returns the targeted ads to Front Door Server 320 in an XML file or other format.

FIG. 11C provides another embodiment of a process for searching. In this embodiment, Search System 340 identifies that the keyword presented to it was misspelled and displays a proposed correction with search results for that correction. In step 660 in FIG. 11C, Search System 340 performs a spell check of the keyword provided to it and identifies a spelling mistake. Search System 340 may determine various proposed spelling corrections. For example, if the user provided the word "sishi," then Search System 340 may determine that there is a spelling mistake and propose a spelling correction of "sushi." The search system will perform a search based on the proposed spelling correction. Search System 340 provides the proposed correction and the search result based on that proposed correction to Front Door Server 320 in step 662. Front Door Server 320 presents the proposed correction and search results to the user via browser 302 (or other communication means) in step 664. The user can accept the correction and results in step 666, or refine the search in the Search box in the Search Pane.

FIG. 12 is a flowchart disclosing one embodiment of a process for displaying search results (step 486 of FIG. 9). In step 700, the keywords identified by Keyword Extractor 322 are displayed. For example, keyword section 180 of FIG. 3 is depicted. In step 702, the keyword that was selected for the search is identified (e.g., by bolding and italicizing, or other means). In one embodiment, the first keyword on the list of ordered keywords is the one initially sent to the Search System. In step 704, the targeted ads received from Advertisement System 342 are depicted. For example, sponsored site section 188 can be created and displayed. In step 706, a subset of search results are displayed. For example, search results section 190 of FIG. 3 can be displayed. Note that Search System 340 may respond to Front Door Server 320 with many search results. The real estate provided in user interface 100 to display search results 190 may not be big enough to include all the search results. Thus, only the most relevant search results will be displayed. In another embodiment, Search System will initially only send a small subset of search results that fit in search results section 190. At the bottom of the search results section 190 will be a link "show more results." That link will be displayed in step 708. If user selects that link, then user interface 100 will navigate to a search page which will display the full set of results or a bigger subset of results from the search.

Note that the above discussion with respect to FIGS. 11A, 11B, 11C, and 12 relate to the first automatic mode, where the system automatically determines a set of keywords, automatically chooses the most relevant keyword, and automatically sends that most relevant keyword to the Search System. As described above, the system also includes a second automatic mode in which after the keywords are identified, the user is provided with an opportunity to select the particular keyword to search on. In this mode, the process of FIG. 10 will be used to identify the appropriate keywords. However, after the keywords have been identified in step 482 of FIG. 9, and prior to searching in step 484 of FIG. 9, the process of FIG. 13 will be used to choose which keyword to search on. In step 740, the keywords will be displayed to the user. For example, the keywords can be displayed as depicted in FIG. 4. In step 742, the user chooses a keyword by selecting one of the keywords using the mouse or other pointing device. In step 744, the list of keywords is reordered so that the chosen keyword is considered the highest ranked keyword. The chosen keyword is sent to Search System 340 in step 484 of FIG. 9. The process of FIG. 9 is otherwise performed as described above.

As described above, the system also includes a manual mode where a user can manually choose to have a search performed based on text within a message. FIG. 14 is a flowchart describing one embodiment of a process for performing a search in the manual mode. In step 800, the system receives a request to compose a message. For example, the user may choose one of the buttons in 130-136 associated with composing a new message. Alternative, step 800 may include receiving a request to read a message. The process in FIG. 14 can be performed while composing a message or reading a message. In step 802 of FIG. 14, the message form used to compose the message is provided to the user, and the user is allowed to insert text into the message. For example, the user interface of FIG. 5 can be provided with message form 200. The user will then type in text into message form 200. The user can highlight a word or phrase in step 804. For example, FIG. 5 shows the word "sushi" highlighted. In step 806, the user will request that a search be performed. For example, the user can select the "Search" option from menu 312. In one embodiment, after highlighting text, the user can right-click on the mouse (or other pointing device) and receive menu 212. In step 808, the keyword or phrase highlighted will be used to perform a search for content and advertisements as discussed above (see FIGS. 11A, 11B and/or 11C). In step 810, the highlighted word or phrase is displayed in the search pane. In step 812, the targeted advertisements are displayed. In some embodiments, an "Insert this link" is added for each advertisement result. In step 814, the search results are displayed. In some embodiments, an "Insert this link" is added for each search result. In step 816, a link to more search results is displayed, as explained above. The result in steps 810, 812, 814 and 816 can be depicted as in FIG. 6. If user selects the link to more results, then the system will navigate to a search page and display more results in step 818, as discussed above. If the user selects "Insert this link," the associated title and link will be inserted into the message being composed.

As shown in FIGS. 1-6, messaging user interface 100 may include a search box 114 to enter text to perform a search within e-mail messages after selecting button 116. The system will then search through all the messages in a folder or all messages associated with all folders to find matches that have the identified text. In one embodiment, the system will also automatically perform a search on the Internet or other domain using the same text. This process is depicted with more detail in the flowchart of FIG. 15. In step 840, the user requests a search of the messages by entering text in text box 114 and selecting button 116. In step 842, a search is performed within the messages in the particular folder or all folders. In step 844, the search results are provided to the user. In one embodiment, all the messages that include the searched text will be included in the message list 144. In step 848, a search for content and advertisements are automatically preformed based on the keyword or phase used to search messages (the words entered into box 114) if the Search pane is open. In another embodiment, the user can be asked whether to perform a search on the Internet. The searching for content and advertisements are performed as discussed above with Front Door Server 320 communicating with Search System 340 and Advertisement System 342. In step 850, the searched word or phrase is depicted in the search pane. In step 852, the targeted ads are displayed. In step 854, the subset of results from the search is displayed. In step 856, the link to additional results is displayed. The results of steps 850, 852, 854, and 856 can result in a user interface as depicted in FIG. 6. If the user selects the link to show more results, then the system will navigate to the search page and display more results in step 858, as described above. In one embodiment, the terms typed into box 114 will be displayed in the Search Pane keywords well and system will perform an internet search if the user has already opted into search feature. If the search pane was closed at time (e.g., displaying an advertisement instead), the user did the email search and the user had previously opted in, the search pane will open and show results. If search pane was closed and user had not previously opted in, the search pane will open but show the opt-in text. If the user then opts-in, the search will be performed and the results subsequently displayed.

FIG. 6 shows a search box 112 for searching the Internet and a search box 116 for searching emails. In one embodiment, there will be one search box, whose use will be contextual. For example, if the interface shows emails, then the search will be for emails related to the keywords entered. At the same time, it will trigger a web search with results displayed in the search pane.

Note that in the above-described flowcharts (FIGS. 8-15), the steps are depicted in a particular order. However, the order depicted in the flowcharts is not required. The steps can be performed in other orders.

Figure 16:
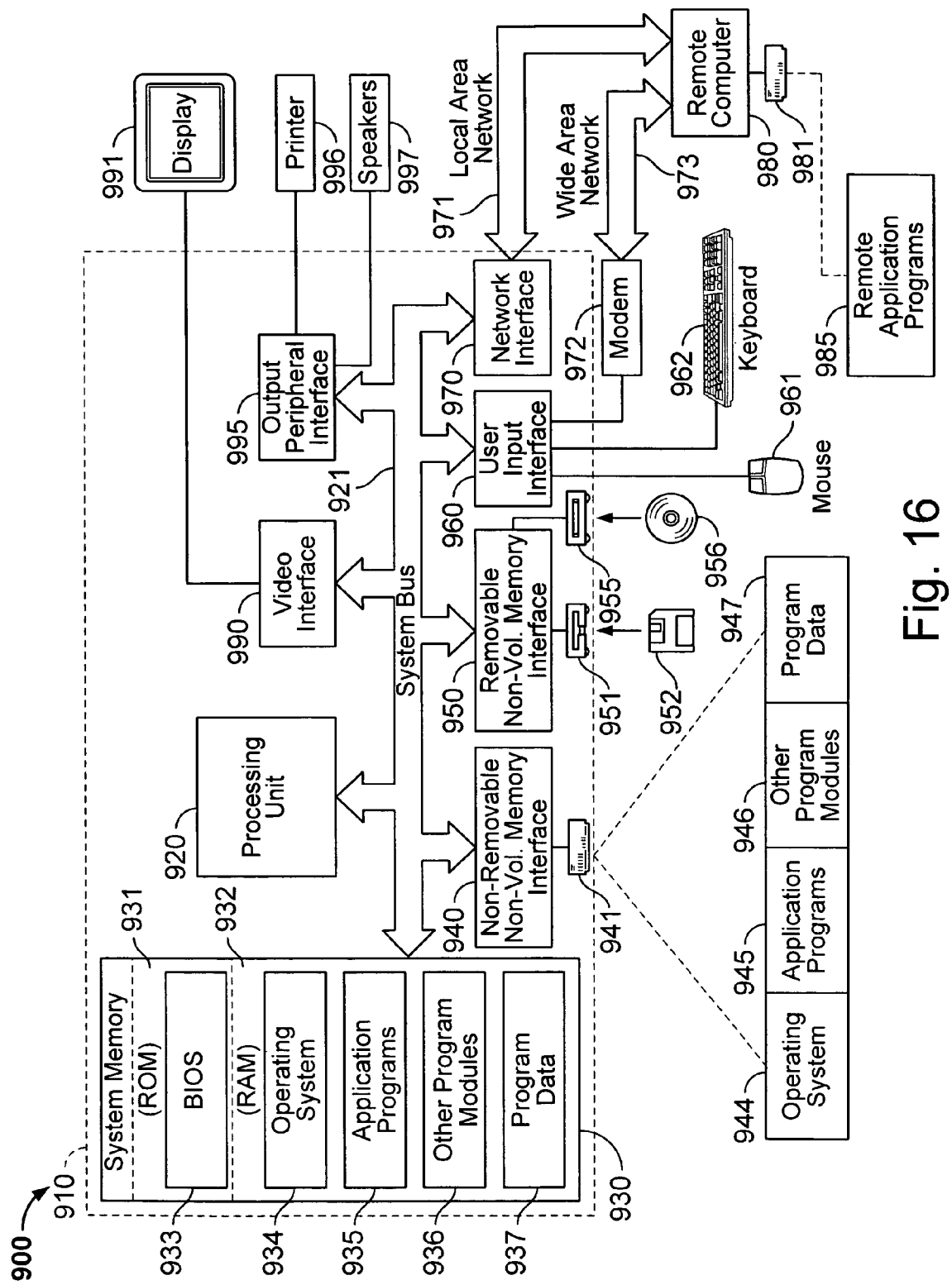
FIG. 16 is a block diagram depicting one example of a computing system.

FIG. 16 illustrates one example of a suitable general computing system 900 that may be used to implement the components of FIG. 7. For example, computing system 900 can be used to implement client 300, Login Server 310, User Profile Server 312, Front Door Server 320, User Data Server 330, one or more of the components of Search System 340 and/or one or more of the components of Advertisement System 342. Computing system 900 is only one example of a suitable computing environment and is not intended to suggest any limitation as to the scope of use or functionality of the technology described herein. Neither should computing system 100 be interpreted as having any dependency or requirement relating to any one or combination of components illustrated in the exemplary computing system 900.

The technologies described herein are operational with numerous other general purpose or special purpose computing system environments or configurations. Examples of well known computing systems, environments, and/or configurations that may be suitable for use include, but are not limited to, personal computers, server computers, hand-held or laptop devices, personal digital assistants, telephones (wired, wireless, or cellular), multiprocessor systems, microprocessor-based systems, set top boxes, programmable consumer electronics, network PCs, minicomputers, mainframe computers, distributed computing environments that include any of the above systems or devices, and the like.

The system may be described in the general context of computer-executable instructions, such as program modules, being executed by a computer. Generally, program modules include routines, programs, objects, components, data structures, etc., that perform particular tasks or implement particular abstract data types. The system may also be implemented in distributed computing environments where tasks are performed by remote processing devices that are linked through a communications network. In a distributed computing environment, program modules may be located in both local and remote computer storage media including memory storage devices.

With reference to FIG. 16, an exemplary system includes a general purpose computing device in the form of a computer 910. Components of computer 910 may include, but are not limited to, a processing unit 920 (which can include multiple processors), a system memory 930, and a system bus 921 that couples various system components including the system memory to the processing unit 920. The system bus 921 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 910 typically includes a variety of computer readable media. Computer readable media can be any available media that can be accessed by computer 910 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 910. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 930 includes computer storage media in the form of volatile and/or nonvolatile memory such as read only memory (ROM) 931 and random access memory (RAM) 932. A basic input/output system 933 (BIOS), containing the basic routines that help to transfer information between elements within computer 910, such as during start-up, is typically stored in ROM 931. RAM 932 typically contains data and/or program modules that are immediately accessible to and/or presently being operated on by processing unit 920. By way of example, and not limitation, FIG. 16 illustrates operating system 934, application programs 935, other program modules 936, and program data 937.

The computer 910 may also include other removable/non-removable, volatile/nonvolatile computer storage media. By way of example only, FIG. 16 illustrates a hard disk drive 941 that reads from or writes to non-removable, nonvolatile magnetic media, a magnetic disk drive 951 that reads from or writes to a removable, nonvolatile magnetic disk 952, and an optical disk drive 955 that reads from or writes to a removable, nonvolatile optical disk 956 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 941 is typically connected to the system bus 921 through a non-removable memory interface such as interface 940, and magnetic disk drive 951 and optical disk drive 955 are typically connected to the system bus 921 by a removable memory interface, such as interface 950.

The drives and their associated computer storage media discussed above and illustrated in FIG. 16, provide storage of computer readable instructions, data structures, program modules and other data to program the processor(s) to perform the methods described herein. In FIG. 16, for example, hard disk drive 941 is illustrated as storing operating system 144, application programs 945, other program modules 946, and program data 947. Note that these components can either be the same as or different from operating system 134, application programs 935, other program modules 936, and program data 937. Operating system 944, application programs 945, other program modules 946, and program data 947 are given different numbers here to illustrate that, at a minimum, they are different copies. A user may enter commands and information into the computer through input devices such as a keyboard 962 and pointing device 961, commonly referred to as a mouse, trackball or touch pad. Other input devices (not shown) may include a microphone, joystick, game pad, satellite dish, scanner, or the like. These and other input devices are often connected to the processing unit 920 through a user input interface 960 that is coupled to the system bus, but may be connected by other interface and bus structures, such as a parallel port, game port or a universal serial bus (USB). A monitor 991 or other type of display device is also connected to the system bus 921 via an interface, such as a video interface 990. In addition to the monitor, computers may also include other peripheral output devices such as speakers 997 and printer 996, which may be connected through a output peripheral interface 990.

The computer 910 may operate in a networked environment using logical connections to one or more remote computers, such as a remote computer 980. The remote computer 180 may be a personal computer, a server, a router, a network PC, a peer device or other common network node, and typically includes many or all of the elements described above relative to the computer 910, although only a memory storage device 181 has been illustrated in FIG. 16. The logical connections depicted in FIG. 16 include a local area network (LAN) 971 and a wide area network (WAN) 973, but may also include other networks. Such networking environments are commonplace in offices, enterprise-wide computer networks, intranets and the Internet.

When used in a LAN networking environment, computer 910 is connected to LAN 971 through a network interface or adapter 970. When used in a WAN networking environment, computer 910 typically includes a modem 972, network interface or other means for establishing communications over the WAN 973, such as the Internet. The modem 972, which may be internal or external, may be connected to the system bus 921 via the user input interface 960, or other appropriate mechanism. In a networked environment, program modules depicted relative to the computer 910, or portions thereof, may be stored in the remote memory storage device. By way of example, and not limitation, FIG. 16 illustrates remote application programs 985 as residing on memory device 981. It will be appreciated that the network connections shown are exemplary and other means of establishing a communications link between the computers may be used.

In some embodiments, users are required to opt-in to the search feature. Alternatively, in other embodiments, privacy concerns are alleviated by providing the user with the ability to opt-out of the search feature.

The examples discussed above mostly relate to email message. However, the technology described herein also pertains to other types of communication such as an instant messages, chat streams or voice messages.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It is intended that the scope of the invention be defined by the claims appended hereto.

We claim:

1. A machine implemented method for providing search capability, comprising:
   providing a messaging user interface, said messaging user interface provides interaction with messages, said messaging user interface including a review pane and a search pane separate from the review pane, the search pane can be opened and closed;
   providing a user with an option to consent to automatic searching while using said messaging user interface, said automatic searching is based on search criteria determined from one or more messages currently presented in the review pane;
   presenting a first message of the messages in the review pane;
   determining whether said search pane is open while said first message is being presented and whether said user has consented to said automatic searching;
   automatically determining search criteria based on said first message while said first message is being presented in said review pane if said search pane is open and if said user consents to automatic searching, said automatically determining search criteria is performed without said user submitting a request that specifies search criteria;
   causing a search based on said search criteria if, and only if, said search pane is open and said user has consented to automatic searching; and
   providing results from said search in said search pane while presenting said first message in said review pane if, and only if, said search pane is open and said user has consented to automatic searching.

2. A method according to claim 1, wherein:
said first message is a message received by said user.

3. A method according to claim 1, further comprising:
causing advertisements to be identified that are relevant to said search criteria if said user consents to automatic searching; and
providing said advertisement in said messaging user interface if said user consents to automatic searching.

4. A method according to claim 1, wherein:
said automatically determining search criteria includes taking into account demographics of said user to identify said search criteria.

5. A method according to claim 1, further comprising:
determining whether said message is unsafe mail, said automatically determining search criteria is performed if said message is not unsafe mail.

6. A method according to claim 1, further comprising:
determining whether said message includes one or more forbidden topics, said automatically determining search criteria is performed if said message does not include a forbidden topic.

7. A method according to claim 1, wherein:
said automatically determining search criteria includes determining search criteria based on all email messages in an inbox.

8. A method according to claim 1, wherein:
said user is a person or a software process;
said first message is an email, an instant message, a chat stream or voice message;
said search criteria includes one or more keywords; and
said steps of providing a messaging user interface, providing a user with an option, automatically determining search criteria, causing a search based on said search criteria, and providing results are performed by a front door server remote from a client device operated by said user.

9. A method according to claim 1, wherein said providing a user with an option to consent to said automatic searching while using said messaging user interface includes providing text that explains said automatic searching and providing an icon for said user to select to indicate that said user consents to said automatic searching while using said messaging user interface, and wherein said method further comprises receiving a selection of said icon from said user.

10. A method according to claim 1, wherein:
said providing a user with an option to consent to automatic searching includes:
determining that said search pane is open while a message is being displayed in said messaging user interface;
determining that said user has not yet consented to said automatic searching; and
providing text explaining said automatic searching and asking said user if said user consents to said automatic searching whenever said search pane is open.

11. A method according to claim 1, wherein:
said providing a messaging user interface includes storing data for default searching;
said step of automatically determining search criteria attempts to find queries that meet a minimum relevance threshold; and
if said step of automatically determining search criteria cannot find queries that meet said minimum relevance threshold than said search criteria is identified based on said data for default searching.

12. A method according to claim 1, further comprising:
receiving a set of one or more keywords;
receiving a request to search within said messaging user interface;
causing a search to be performed within said messaging user interface based on said keywords in response to said request to search within said messaging user interface; and automatically causing an internet search to be performed based on said keywords in response to said request to search within said messaging user interface.

13. A method according to claim 1, further including:
determining that a search pane within said messaging user interface is open while a message to said user is being presented in said messaging user interface; and
determining that said user has previously provided explicit consent to said automatic searching whenever said search pane is open.

14. One or more processor readable storage devices storing processor readable code, said processor readable code for programming one or more processors to perform a method comprising:
providing a messaging user interface, said messaging user interface allows messages to be composed and sent, said messaging user interface including a review pane for composing the messages and a search pane separate from the review pane;
presenting a first message of the messages in the review pane;
automatically determining multiple search criteria options based on said first message being presented in said review pane, said automatically determining multiple search criteria options is performed without a user submitting a request that specifies search criteria;
providing said user with a choice of said multiple search criteria options in said search pane messaging user interface;
receiving a selection from said user of one of said multiple search criteria options;
causing a search based on said selected one of said multiple search criteria options; and
providing results from said search in said search pane.

15. One or more processor readable storage devices according to claim 14, wherein:
said automatically determining multiple search criteria options takes into account common words, sensitive language and past searching data.

16. One or more processor readable storage devices according to claim 14, wherein said multiple search criteria options are keywords.

17. The one or more processor readable storage devices according to claim 14, further comprising:
providing a user with an option to consent to automatic suggestions of keywords based on a message being presented in said messaging user interface, said automatically determining multiple search criteria options based on said first message being presented in said messaging user interface is performed only if said user provides said consent.

* * * * *

UNITED STATES PATENT AND TRADEMARK OFFICE
CERTIFICATE OF CORRECTION

| | | |
|---|---|---|
| PATENT NO. | : 7,730,081 B2 | Page 1 of 1 |
| APPLICATION NO. | : 11/252899 | |
| DATED | : June 1, 2010 | |
| INVENTOR(S) | : Kristin D. Bromm et al. | |

It is certified that error appears in the above-identified patent and that said Letters Patent is hereby corrected as shown below:

In column 19, line 1, in Claim 12, delete "internet" and insert -- Internet --, therefor.

In column 20, lines 2-3, in Claim 14, after "pane" delete "messaging user interface".

Signed and Sealed this
Eighth Day of February, 2011

David J. Kappos
*Director of the United States Patent and Trademark Office*